(12) United States Patent
Behrooznia (10) Patent No.: US 10,338,577 B2
(45) Date of Patent: Jul. 2, 2019

(54) SENSOR-BASED AUTOMATED TRANSIT MAINTENANCE SYSTEM

(71) Applicant: Cubic Corporation, San Diego, CA (US)

(72) Inventor: Rasheed Behrooznia, San Diego, CA (US)

(73) Assignee: Cubic Corporation, San Diego, CA (US)

(*) Notice: Subject to any disclaimer, the term of this patent is extended or adjusted under 35 U.S.C. 154(b) by 0 days.

(21) Appl. No.: 16/116,564

(22) Filed: Aug. 29, 2018

(65) Prior Publication Data
US 2019/0066411 A1 Feb. 28, 2019

Related U.S. Application Data

(60) Provisional application No. 62/552,268, filed on Aug. 30, 2017.

(51) Int. Cl.
*G05B 23/02* (2006.01)
*G07C 5/08* (2006.01)
(Continued)

(52) U.S. Cl.
CPC ..... *G05B 23/0272* (2013.01); *G05B 23/0267* (2013.01); *G06Q 10/20* (2013.01);
(Continued)

(58) Field of Classification Search
CPC ........ G06Q 10/20; G06Q 50/30; G07C 5/008; G07C 5/0808; G05B 23/0267;
(Continued)

(56) References Cited

U.S. PATENT DOCUMENTS

| 5,442,553 A * | 8/1995 | Parrillo | G06F 8/65 455/420 |
| 2002/0103582 A1* | 8/2002 | Ohmura | G07C 5/008 701/31.4 |

(Continued)

FOREIGN PATENT DOCUMENTS

| EP | 2712204 A1 * | 3/2014 |
| EP | 2775408 A1 * | 9/2014 |

(Continued)

OTHER PUBLICATIONS

International Search Report and Written Opinion dated Nov. 9, 2018 for International Patent Application No. PCT/US2018/048894, filed Aug. 30, 2018, all pages.

(Continued)

*Primary Examiner* — Behrang Badii
*Assistant Examiner* — David A Testardi
(74) *Attorney, Agent, or Firm* — Kilpatrick Townsend & Stockton (57) ABSTRACT

Systems and methods for implementing a sensor-based transit maintenance system. A plurality of sensors are located at a plurality of transit locations within a transit system. The plurality of sensors are configured to collect a plurality of sensor measurements of at least one transit location device. A transit server may receive sensor data comprising the plurality of sensor measurements. The transit server may determine, based on the sensor data, that a current or future defect exists within the transit system. The transit server may determine a transit location of the plurality of transit locations at which the defect is located. The transit server may generate maintenance instructions for addressing the defect and send the maintenance instructions either to a portable electronic device or to one of the at least one transit location device at the transit location.

17 Claims, 10 Drawing Sheets

(51) Int. Cl.
  *G08G 1/00* (2006.01)
  *G06Q 50/30* (2012.01)
  *G06Q 10/00* (2012.01)
  *G07C 5/00* (2006.01)
  *G08B 21/18* (2006.01)

(52) U.S. Cl.
  CPC ............ *G06Q 50/30* (2013.01); *G07C 5/008* (2013.01); *G07C 5/0808* (2013.01); *G08B 21/187* (2013.01); *G08G 1/20* (2013.01)

(58) Field of Classification Search
  CPC  G05B 23/0272; G08B 21/187; B66B 1/3461; B66B 5/0025; B66B 5/0087
  See application file for complete search history.

(56) References Cited

U.S. PATENT DOCUMENTS

| | | | | |
|---|---|---|---|---|
| 2002/0103583 | A1* | 8/2002 | Ohmura | G07C 5/008 701/31.4 |
| 2003/0055666 | A1* | 3/2003 | Roddy | B61L 27/0094 705/305 |
| 2004/0085198 | A1* | 5/2004 | Saito | B60G 17/0185 340/438 |
| 2006/0144646 | A1* | 7/2006 | Engel | B66B 5/0087 187/391 |
| 2009/0210283 | A1* | 8/2009 | Miyamoto | G06F 11/0748 705/7.14 |
| 2012/0141136 | A1* | 6/2012 | Blume | G07F 19/20 398/140 |
| 2012/0303323 | A1* | 11/2012 | Ha | D06F 33/02 702/183 |
| 2013/0268501 | A1* | 10/2013 | Gorinevsky | G06Q 10/20 707/693 |
| 2014/0085056 | A1* | 3/2014 | Kong | H04L 12/2827 340/10.51 |
| 2014/0131436 | A1* | 5/2014 | Critchley | G01R 1/02 235/375 |
| 2014/0170969 | A1* | 6/2014 | DeVos | G06F 17/30 455/41.1 |
| 2014/0228983 | A1* | 8/2014 | Groskreutz | G05D 23/1905 700/83 |
| 2014/0262629 | A1* | 9/2014 | Toutaoui | B66B 1/3461 187/393 |
| 2014/0288761 | A1* | 9/2014 | Butler | G07C 5/0816 701/29.6 |
| 2015/0021391 | A1* | 1/2015 | Lundell | G06Q 10/20 235/375 |
| 2015/0067567 | A1* | 3/2015 | Langsdorf | G06F 3/0484 715/771 |
| 2015/0074179 | A1* | 3/2015 | Graw | G07F 19/201 709/203 |
| 2015/0287311 | A1 | 10/2015 | Smith et al. | |
| 2015/0370236 | A1* | 12/2015 | Du Plessis | F03D 17/00 700/287 |
| 2016/0012707 | A1* | 1/2016 | McKinley | G08B 25/10 340/679 |
| 2016/0117580 | A1* | 4/2016 | Ortega | G06Q 10/20 235/375 |
| 2016/0117581 | A1* | 4/2016 | Ortega | G06Q 10/20 235/375 |
| 2016/0134686 | A1* | 5/2016 | Youker | H04L 47/823 709/217 |
| 2017/0022028 | A1* | 1/2017 | Cortona | B66B 5/0006 |
| 2018/0218277 | A1* | 8/2018 | Korsedal | G06N 7/005 |
| 2018/0247278 | A1* | 8/2018 | Winz | G06T 7/0004 |
| 2018/0282112 | A1* | 10/2018 | Mahoney | B66B 1/3461 |

FOREIGN PATENT DOCUMENTS

| | | | |
|---|---|---|---|
| JP | 02106578 A | * | 4/1990 |
| JP | 2006202084 A | * | 8/2006 |
| JP | 2007114907 A | * | 5/2007 |
| JP | 2008275545 A | * | 11/2008 |
| JP | 2015019172 A | * | 1/2015 |

OTHER PUBLICATIONS

Paula Fraga-Lamas et al: "Towards the Internet of Smart Trains: A Review on Industrial IoT-Connected Railways", Sensors, vol. 17, No. 6, Jun. 21, 2017, XP055520235, DOI: 10.3390/s17061457, 1. Introduction, 5. The Rise of Internet of Trains Industrial IoT Developments in the Rail Industry, all pages.

* cited by examiner

SENSOR-BASED AUTOMATED TRANSIT MAINTENANCE SYSTEM

CROSS-REFERENCES TO RELATED APPLICATIONS

This application claims priority to U.S. Provisional Patent Application No. 62/552,268 filed Aug. 30, 2017 titled "REAL-TIME ANYWHERE VIRTUAL ENVIRONMENT (RAVE)," the entire disclosure of which is hereby incorporated by reference, for all purposes, as if fully set forth herein.

BACKGROUND OF THE INVENTION

As populations in the world's largest city centers continue to grow, often at an exponential rate, public and private transportation systems are becoming increasingly burdened with increased ridership and transit stations are becoming increasingly congested, causing delays to transit users and increased costs to the transportation systems. The use of sophisticated communication devices presents an appealing approach for managing such overcrowding. Unfortunately, existing devices and approaches are insufficient to alleviate these problems. Accordingly, new systems, methods, and other techniques are needed.

SUMMARY OF THE INVENTION

A summary of the invention is given through a description of various examples. As used below, any reference to a series of examples is to be understood as a reference to each of those examples disjunctively (e.g., "Examples 1-4" is to be understood as "Examples 1, 2, 3, or 4").

Example 1 is a transit maintenance system comprising: a plurality of sensors located at a plurality of transit locations within a transit system, wherein the plurality of sensors are configured to collect a plurality of sensor measurements of at least one transit location device; and a transit server comprising one or more processors, wherein the one or more processors are configured to perform operations comprising: receiving sensor data comprising the plurality of sensor measurements; determining, based on the sensor data, that a current or future defect exists within the transit system; determining a transit location of the plurality of transit locations at which the defect is located; generating maintenance instructions for addressing the defect; and sending the maintenance instructions either to a portable electronic device or to one of the at least one transit location device at the transit location.

Example 2 is the transit maintenance system of example(s) 1, wherein the operations further comprise: receiving transit data from at least one of the plurality of transit locations, wherein the transit data includes ridership information, and wherein it is determined that the defect exists within the transit system further based on the transit data and the sensor data.

Example 3 is the transit maintenance system of example(s) 1-2, wherein each of the plurality of sensor measurements includes a raw measurement of a transit location device of the at least one transit location device, wherein the raw measurement corresponds to one or more of voltage, current, capacitance, inductance, temperature, and frequency.

Example 4 is the transit maintenance system of example(s) 1-3, further comprising: a plurality of local data collectors located at the plurality of transit locations, wherein each of the plurality of local data collectors is configured to: receive at least one of the plurality of sensor measurements from at least one of the plurality of sensors; and send the at least one of the plurality of sensor measurements to the transit server.

Example 5 is the transit maintenance system of example(s) 1-4, wherein the operations further comprise: selecting the portable electronic device from a group of portable electronic devices based on one or more of: the transit location; a current location of the portable electronic device; a type of the defect; and the maintenance instructions.

Example 6 is the transit maintenance system of example(s) 1-5, wherein the operations further comprise: generating, based on the sensor data, a defect likelihood score; comparing the defect likelihood score to a threshold; and in response to determining that the defect likelihood score exceeds the threshold, determining that a future defect exists within the transit system.

Example 7 is the transit maintenance system of example(s) 1-6, wherein the operations further comprise: receiving, from the portable electronic device, a message indicating that the defect has been addressed.

Example 8 is a method comprising: receiving sensor data comprising a plurality of sensor measurements of at least one transit location device, wherein the plurality of sensor measurements are collected by a plurality of sensors located at a plurality of transit locations within a transit system; determining, based on the sensor data, that a current or future defect exists within the transit system; determining a transit location of the plurality of transit locations at which the defect is located; generating maintenance instructions for addressing the defect; and sending the maintenance instructions either to a portable electronic device or to one of the at least one transit location device at the transit location.

Example 9 is the method of example(s) 8, further comprising: receiving transit data from at least one of the plurality of transit locations, wherein the transit data includes ridership information, and wherein it is determined that the defect exists within the transit system further based on the transit data and the sensor data.

Example 10 is the method of example(s) 8-9, wherein each of the plurality of sensor measurements includes a raw measurement of a transit location device of the at least one transit location device, wherein the raw measurement corresponds to one or more of voltage, current, capacitance, inductance, temperature, and frequency.

Example 11 is the method of example(s) 8-10, wherein the sensor data is received from a plurality of local data collectors located at the plurality of transit locations, and wherein each of the plurality of local data collectors is configured to receive at least one of the plurality of sensor measurements from at least one of the plurality of sensors.

Example 12 is the method of example(s) 8-11, further comprising: selecting the portable electronic device from a group of portable electronic devices based on one or more of: the transit location; a current location of the portable electronic device; a type of the defect; and the maintenance instructions.

Example 13 is the method of example(s) 8-12, further comprising: generating, based on the sensor data, a defect likelihood score; comparing the defect likelihood score to a threshold; and in response to determining that the defect likelihood score exceeds the threshold, determining that a future defect exists within the transit system.

Example 14 is the method of example(s) 8-13, further comprising: receiving, from the portable electronic device, a message indicating that the defect has been addressed.

Example 15 is a non-transitory computer-readable medium comprising instructions that, when executed by one or more processors, cause the one or more processors to perform operations comprising: receiving sensor data comprising a plurality of sensor measurements of at least one transit location device, wherein the plurality of sensor measurements are collected by a plurality of sensors located at a plurality of transit locations within a transit system; determining, based on the sensor data, that a current or future defect exists within the transit system; determining a transit location of the plurality of transit locations at which the defect is located; generating maintenance instructions for addressing the defect; and sending the maintenance instructions either to a portable electronic device or to one of the at least one transit location device at the transit location.

Example 16 is the non-transitory computer-readable medium of example(s) 15, wherein the operations further comprise: receiving transit data from at least one of the plurality of transit locations, wherein the transit data includes ridership information, and wherein it is determined that the defect exists within the transit system further based on the transit data and the sensor data.

Example 17 is the non-transitory computer-readable medium of example(s) 15-16, wherein each of the plurality of sensor measurements includes a raw measurement of a transit location device of the at least one transit location device, wherein the raw measurement corresponds to one or more of voltage, current, capacitance, inductance, temperature, and frequency.

Example 18 is the non-transitory computer-readable medium of example(s) 15-17, wherein the sensor data is received from a plurality of local data collectors located at the plurality of transit locations, and wherein each of the plurality of local data collectors is configured to receive at least one of the plurality of sensor measurements from at least one of the plurality of sensors.

Example 19 is the non-transitory computer-readable medium of example(s) 15-18, wherein the operations further comprise: selecting the portable electronic device from a group of portable electronic devices based on one or more of: the transit location; a current location of the portable electronic device; a type of the defect; and the maintenance instructions.

Example 20 is the non-transitory computer-readable medium of example(s) 15-19, wherein the operations further comprise: generating, based on the sensor data, a defect likelihood score; comparing the defect likelihood score to a threshold; and in response to determining that the defect likelihood score exceeds the threshold, determining that a future defect exists within the transit system.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Embodiments of the present invention include systems, methods, and other techniques for implementing a sensor-based automated transit maintenance system. The transit system maintenance system may monitor the health of a transit system through the use of sensors strategically located at transit devices, such as the various ticket vending machines, gates, transit vehicles, and the like. The sensors may collect raw measurements, such as voltage and current measurements, and local data collectors may send these measurements to a transit server. The transit server may identify current or future defects within the transit system, and may generate maintenance instructions for addressing the defects. The maintenance instructions may be sent to portable electronic devices used by service technicians who can address and repair the defects. Although embodiments are described in reference to transit systems, a person of ordinary skill in the art will understand that alternative embodiments may vary from the embodiments discussed herein, and alternative applications may exist, such as in general transportation, residential and commercial servicing, and other industries.

Figure 1:
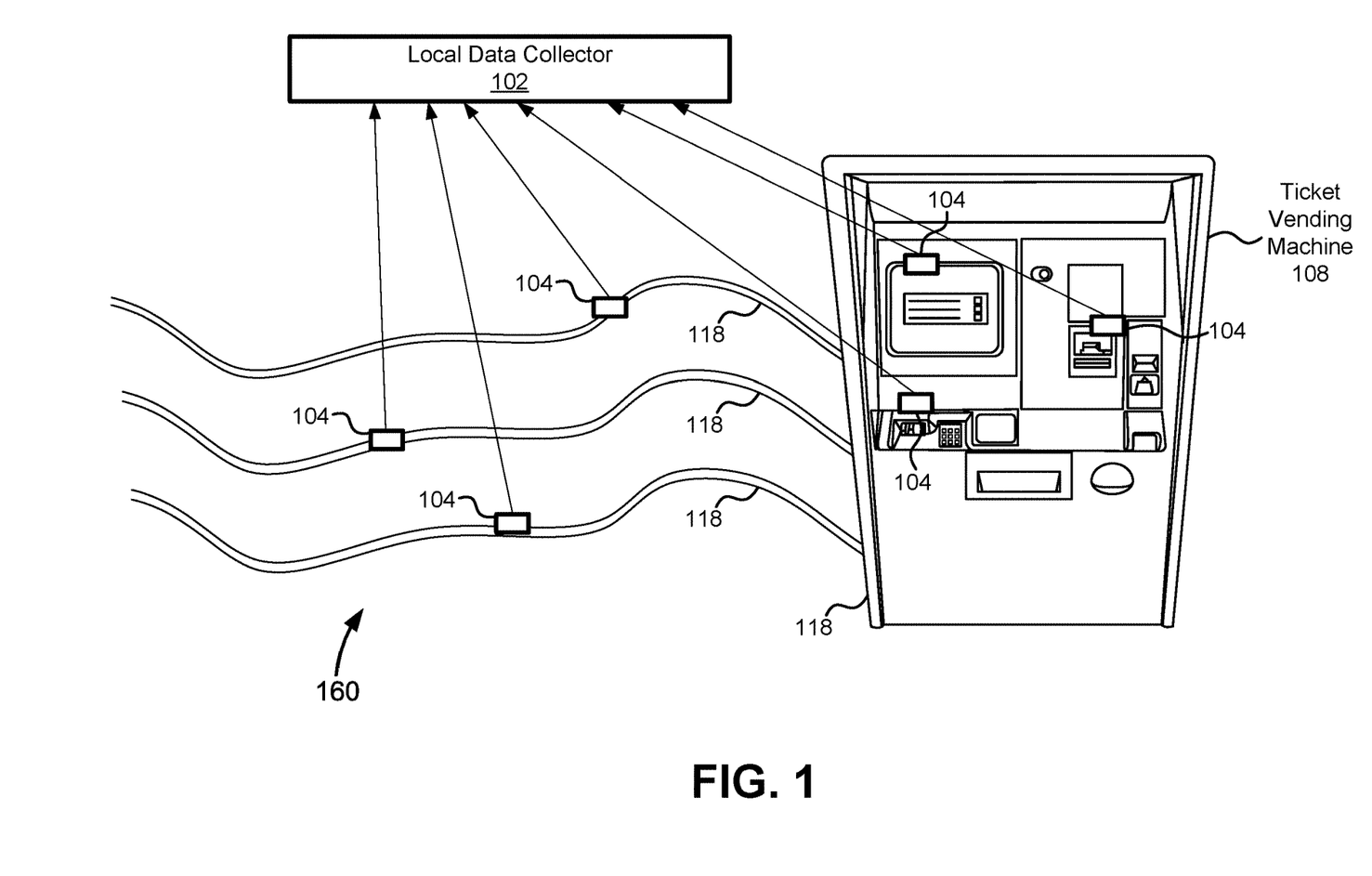
FIG. 1 illustrates various components of a sensor-based transit maintenance system at a transit location, according to some embodiments of the present invention.

FIG. 1 illustrates various components of a sensor-based transit maintenance system at a transit location 160, according to some embodiments of the present invention. The transit maintenance system may include a plurality of sensors 104 positioned at various points of interest at transit location 160 so as to collect sensor measurements of one or more transit location devices 118. In some embodiments, transit location devices 118 may include a ticket vending machine 108 and the electrical connections feeding into or out from ticket vending machine 108. Sensors 104 may be configured to collect sensor measurements of transit location devices 118 and send the sensor measurements to a local data collector 102 via one or more wired and/or wireless connections. Analysis of the sensor measurements may allow the transit maintenance system to determine that a current defect exists within the transit system or to predict that a defect will exist in the future.

Figure 2:
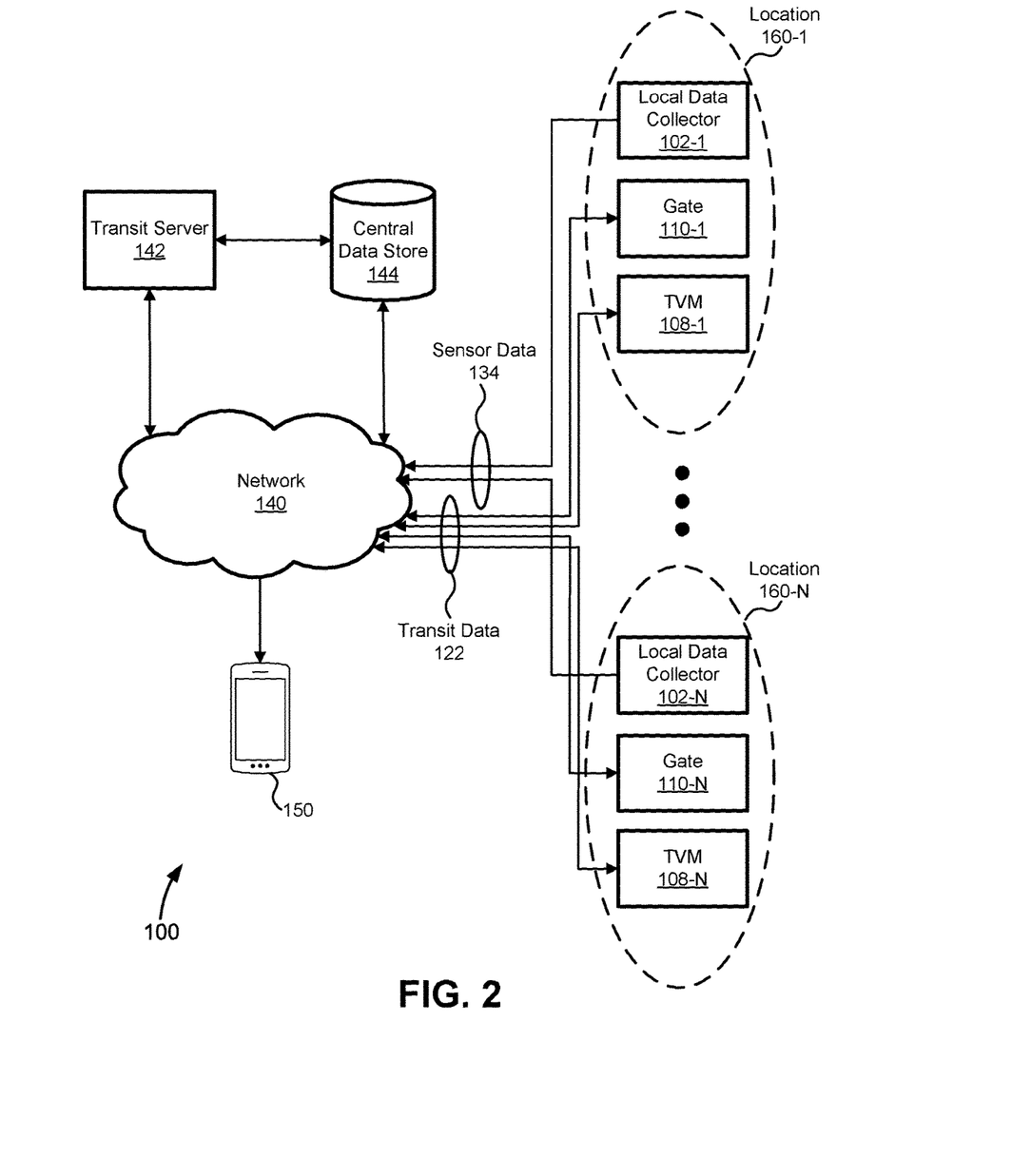
FIG. 2 illustrates a block diagram of a transit system, according to some embodiments of the present invention.

FIG. 2 illustrates a block diagram of a transit system 100, according to some embodiments of the present invention. Transit system 100 may include a plurality of local data collectors 102, gates 110, and ticket vending machines 108 located at a plurality of locations 160 (alternatively referred to herein as transit locations 160). Each of locations 160 may include a non-restricted access area and a restricted access area. The non-restricted access area may include areas that are freely accessible to the general public, whereas the restricted access area may be reserved exclusively for customers of transit system 100. Examples of a restricted access area may include: the inside of a bus or train, a bus or train platform, the inside of a bus or train station, and the like.

Each of locations 160 may include a single or multiple gates 110, and in some embodiments each of gates 110 may include an entry point that defines a passageway and separates the non-restricted access area from the restricted access area. Each of gates 110 may be communicatively coupled to a network 140 via one or more wired and/or wireless connections. Each of locations 160 may include a single or multiple ticket vending machines 108, and in some embodiments each of ticket vending machines 108 may provide tickets to transit customers in exchange for money or some other form of value. Transit system 100 may also include a transit server 142 and a central data store 144, each of which may be communicatively coupled to network 140. Transit server 142 may include a single or multiple processors, and may write, retrieve, or store data to central data store 144 or any of gates 110 or ticket vending machines 108. Although embodiments herein are described in reference to transit systems, the restricted access area may correspond to an entertainment venue, a building, or any location involving metered access.

In some embodiments, a portable electronic device 150 may be in data communication with network 140 and the various components of transit system 100. Portable electronic device 150 may be carried by a transit personnel or service technician thereby allowing maintenance instructions generated by transit server 142 to be received by portable electronic device 150 so that the service technician may locate and address any defects within transit system 100. Although a single portable electronic device 150 is shown, it is appreciated that multiple portable electronic devices 150 may be in data communication with network 140 and the various components of transit system 100.

Figure 3:
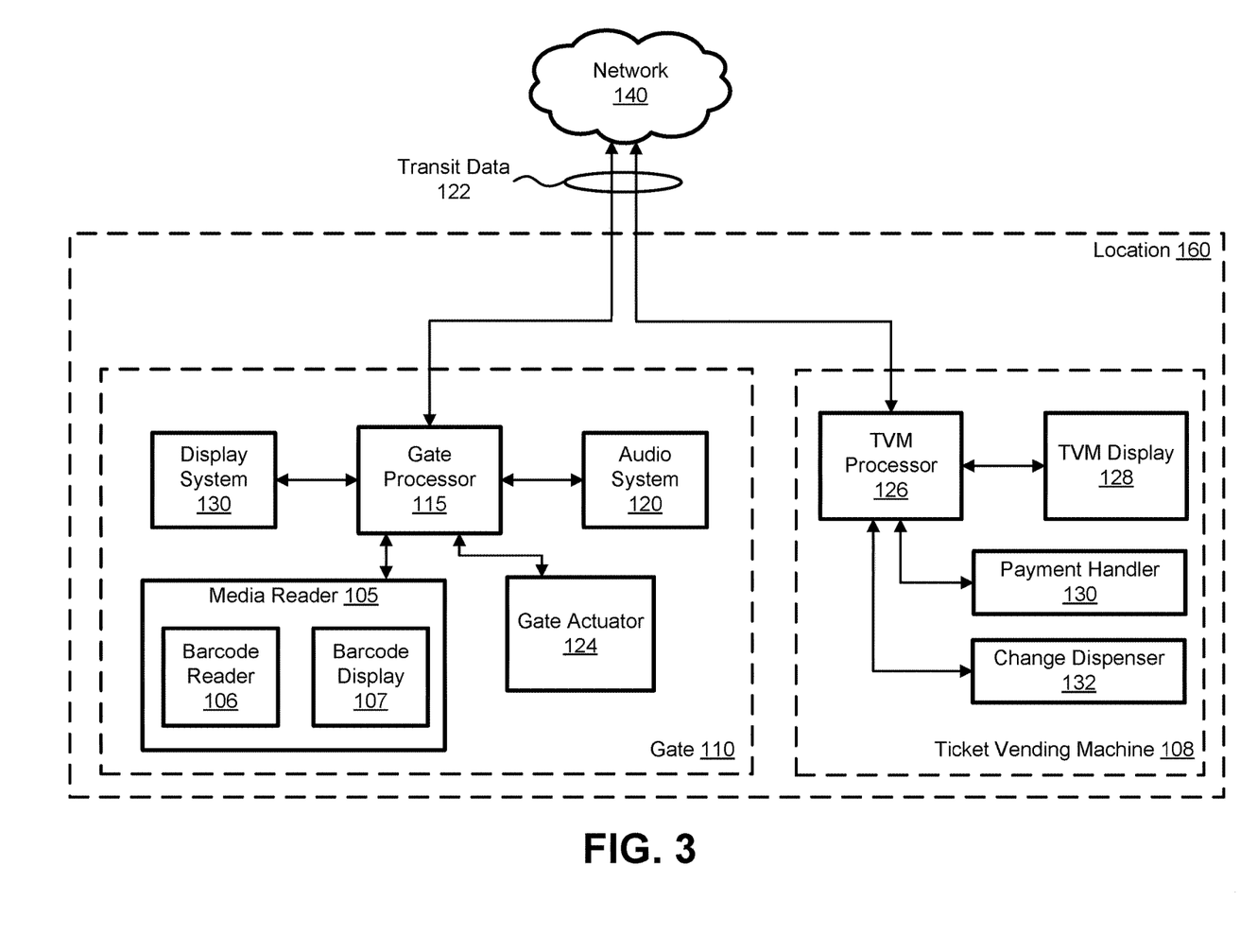
FIG. 3 illustrates a block diagram of a gate and a ticket vending machine in communication with a network, according to some embodiments of the present invention.

FIG. 3 illustrates a block diagram of gate 110 and ticket vending machine 108 in communication with network 140, according to some embodiments of the present invention. Gate 110 and ticket vending machine 108 may send transit data 122 to transit server 142 via network 140. Transit data 122 may include ridership information corresponding to at least one transit customer. The ridership information may include: a request from a transit customer to purchase a ticket, a request from a transit customer to create a transit customer account, an approved payment amount to be added to a transit customer account, an indication that a transit customer has entered transit system 100 through a gate, an indication that a transit customer has exited transit system 100 through a gate, and the like.

Gate 110 may be equipped with a gate validation system for determining whether a transit customer is allowed to access the restricted access area and/or for facilitating the passage of the transit customer through gate 110. Accordingly, gate 110 may serve as one of several possible entry points into transit system 100 (i.e., the restricted access area of transit system 100). One of ordinary skill in the art will recognize that gate 110 can vary in appearance and functionality. In some embodiments, gate 110 includes a media reader 105 whereby a fare media or an electronic device carried by a transit customer does not have to make contact with media reader 105 to communicate. For example, media reader 105 may include a barcode reader 106 and a barcode display 107. In some embodiments, gate 110 includes an audio system 120 which can give verbal instructions on using any of the components of gate 110. For instance, in some embodiments audio system 120 can alert the transit customer that his/her fare media or electronic device is not correctly placed to communicate with media reader 105.

In some embodiments, gate 110 includes a gate processor 115 in communication with network 140. Gate processor 115 may include a single or multiple processors and an associated memory. Gate processor 115 may communicate with a display system 130 and provide the messaging presented on display system 130. Gate processor 115 can generate the messages to be displayed on display system 130 or receive the message to be displayed from any number of sources over network 140. Gate processor 115 may also communicate with audio system 120 and may generate the messages broadcast from audio system 120 or receive the message to be broadcast from any number of sources over the network 140. Gate processor 115 may communicate with media reader 105 and may determine if a fare media allows passage or may send information received from the fare media over network 140 to transit server 142 to make the determination. In response to a communication error between media reader 105 and the fare media, gate processor 115 may communicate with media reader 105 and relay information from and to the other systems such as to audio system 120 to give an audio indication that the fare media is not correctly placed.

In some embodiments, display system 130 may display a message for the transit customer that the fare media is not in the correct place and can indicate to the transit customer where to correctly place the fare media to allow proper communication. In some embodiments, display system 130 can display any manner of other messages including instructions for using gate 110, instructions for using transit system 100, and advertising. In various embodiments, media reader 105 may comprise a contactless reader and/or a reader that requires contact with the object to be read. In some embodiments, media reader 105 may communicate with the fare media or the electronic device carried by the transit customer at a considerable distance. Barriers associated with gate 110 may be opened up by a gate actuator 124 to allow the transit customer passage upon a successful communication between media reader 105 and the fare media or the electronic device carried by the transit customer.

In some embodiments, media reader 105 may be configured to read and display barcodes containing encrypted or unencrypted data. Barcode display 107 may include any type of electronic display. Barcode reader 106 may include a camera, laser scanner, charge-coupled device (CCD) reader, among other possibilities. In some embodiments, communication between media reader 105 and the electronic device carried by the transit customer may utilize the transmission and reception of electromagnetic wireless signals. For example, the two devices may communicate using near-field communication (NFC), Bluetooth low energy (BLE), radio-frequency identification (RFID), and the like. In some embodiments, media reader 105 may include an RFID reader and the fare media or the electronic device carried by the transit customer may include an RFID tag. The RFID tag may be may be passive, active, or battery-assisted passive.

Ticket vending machine 108 may be configured to distribute reloadable prepaid cards (e.g., fare media) in exchange for payment by the transit customer. In many instances, transit customers can purchase and reload reloadable prepaid cards, register the cards with a transit customer account, and manage their account at ticket vending machine 108. Additionally or alternatively, ticket vending machine 108 may be used by the transit customer to add value to the transit customer account or to purchase a ticket without the need for a tangible fare media by, for example, providing the electronic device of the transit customer with an electronic ticket.

In some embodiments, ticket vending machine 108 includes a ticket vending machine processor 126 for controlling a ticket vending machine display 128, a payment handler 130, and a change dispenser 132. For example, ticket vending machine processor 126 may provide messages and/or images to be displayed on ticket vending machine display 128, may receive indications of payment from payment handler 130, and may cause change dispenser 132 to distribute a particular change amount. Payment handler 130 and change dispenser 132 may include various electrical and mechanical components for receiving and distributing money. For example, payment handler 130 may include a bill loader and/or a coin slot for accepting cash.

Figure 4:
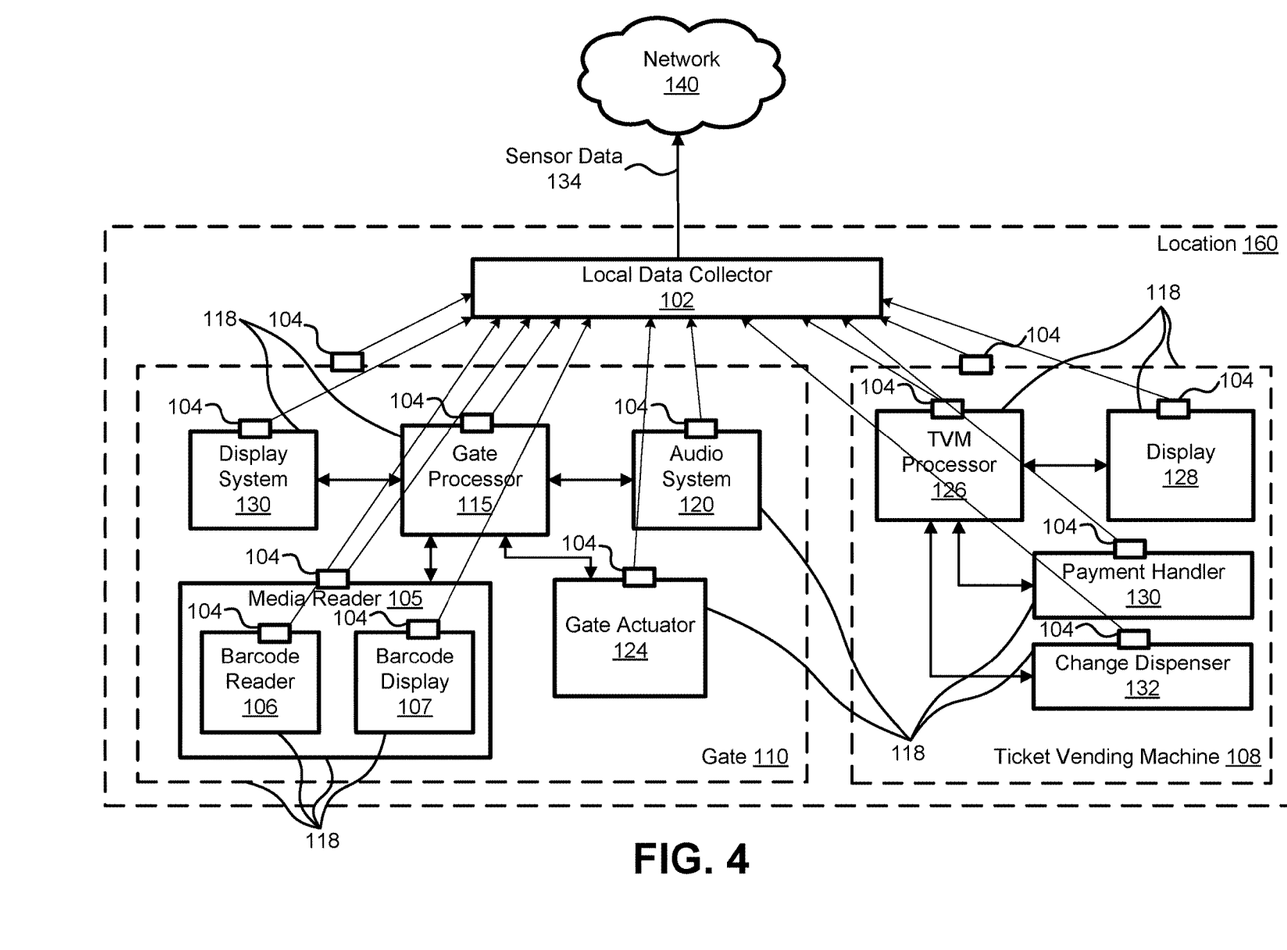
FIG. 4 illustrates a block diagram of various sensors collecting and sending sensor measurements to a local data collector, according to some embodiments of the present invention.

FIG. 4 illustrates a block diagram of various sensors 104 collecting and sending sensor measurements to local data collector 102 which sends sensor data 134 to transit server 142 via network 140, according to some embodiments of the present invention. Sensors 104 may be coupled to or positioned near one or more of transit location devices 118 so as to collect sensor measurements of transit location devices 118. In some instances, one or more sensors 104 may be configured to collect raw measurements corresponding to a voltage, a current, a capacitance, an inductance, a temperature, or a frequency associated with transit location devices 118. For example, one of sensors 104 may be a voltage sensor configured to collect voltage measurements of the DC power supply of payment handler 130. As another example, one of sensors 104 may be a temperature sensor configured to collect temperature measurements of the chassis of audio system 130. As another example, one of sensors 104 may be a current sensor configured to collect current measurements of a light-emitting diode (LED) within display system 130. Other possibilities are contemplated.

Figure 5:
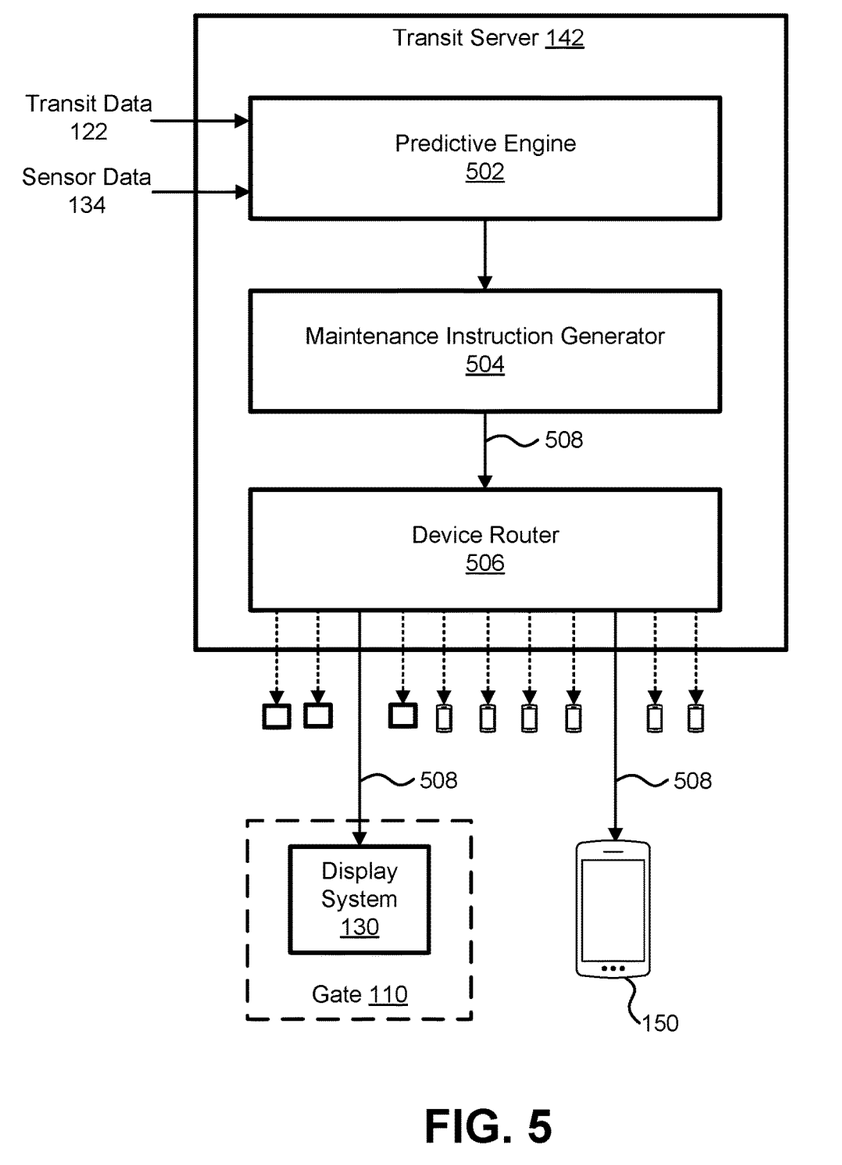
FIG. 5 illustrates a block diagram of a transit server, according to some embodiments of the present invention.

FIG. 5 illustrates a block diagram of transit server 142, according to some embodiments of the present invention. In some embodiments, transit server 142 may include a predictive engine 502 for determining whether a current or future defect exists within transit system 100. Predictive engine 502 may receive one or both of transit data 122 and sensor data 134. The determination of whether a defect exists may be sent to maintenance instruction generator 504 which may generate maintenance instructions 508 for addressing the defect. Maintenance instructions 508 may include textual, graphical, and/or audible instructions that may be presented to the service technician on portable electronic device 150. For example, maintenance instructions 508 may include 2D and/or 3D models of transit location devices 118 that can be used to help the service technician replace or repair a broken component. Maintenance instructions 508 may include a geolocation to allow GPS navigation from the service technician's current position to the equipment that caused the defect.

Maintenance instructions 508 may be routed to portable electronic device 150 by device router 506 which may be configured to select portable electronic device 150 from a group of portable electronic devices based on transit location 160 of the defect, a current location of portable electronic device 150 in relation to the group of portable electronic devices, the type of defect, and/or the maintenance instructions 508. For example, device router 506 may maintain a schedule for each service technician and assign maintenance instructions 508 based on the availability of each service technician and the current or future location of each service technician. In some embodiments, the skills of each service technician may be considered by matching the type of defect with the skills of the service technician (e.g., hardware defects may be matched with hardware service technicians). An optimization process may also be used when assigning maintenance instructions 508 so as to reduce the overall travel time of the difference service technicians. For example, when possible, maintenance instructions 508 corresponding to defects at the same transit location are assigned to the same service technician (i.e., routed to the same portable electronic device 150).

Alternatively or additionally, maintenance instructions 508 may be converted into a scannable code and sent to a display device associated with the particular transit location device 118 at which the defect exists. For example, if the particular transit location device 118 at which the defect exists is gate 110 or any component thereof, device router 506 may send maintenance instructions 508 to display system 130, as illustrated in FIG. 5. In some embodiments, device router 506 may detect that both portable electronic device 150 and the display device associated with the particular transit location device 118 at which the defect exists are both available to receive maintenance instructions 508. In such embodiments, device router 506 may partition maintenance instructions 508 into virtual instructions and non-virtual instructions, and may send the virtual instructions to the display device and the non-virtual instructions to portable electronic device 150. The virtual instructions may include data of the modeled hardware that may be displayed in an augmented reality (AR) visualization on portable electronic device 150. The size of such data may be too large to download onto portable electronic device 150 prior to the service technician arriving at transit location 160 where portable electronic device 150 may connect directly to network 140. In some implementations, the scannable code may provide a link (e.g., a web address) to a storage location in central data store 144 through which the virtual instructions may be downloaded onto portable electronic device 150.

Figure 6:
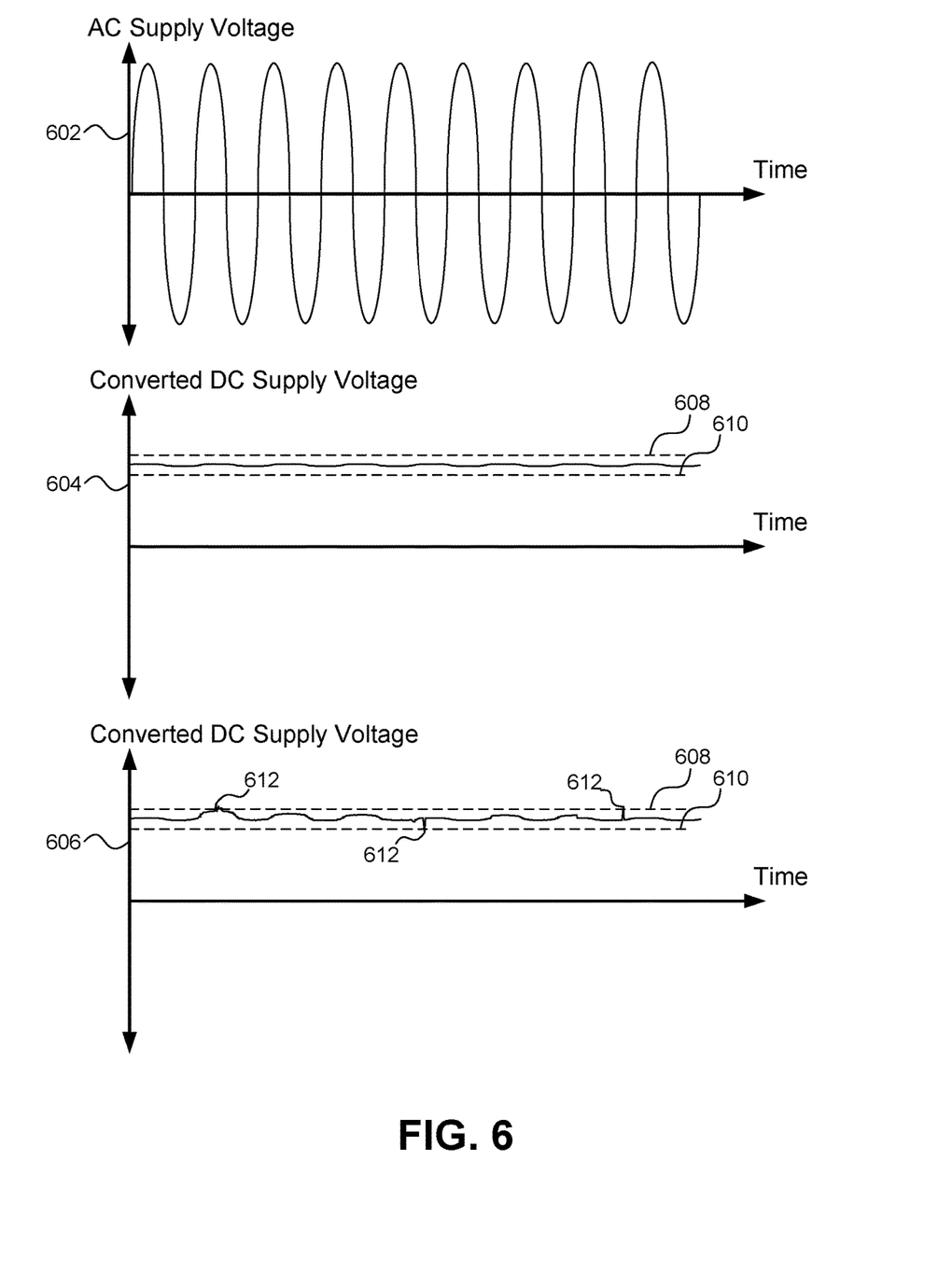
FIG. 6 illustrates examples of sensor measurements collected by various sensors, according to some embodiments of the present invention.

FIG. 6 illustrates examples of sensor measurements collected by sensors 104, according to some embodiments of the present invention. In the example shown, the sensor measurements may be collected from electrical conductors feeding into ticket vending machine 108. Sensor measurement 602 may be an AC supply voltage collected outside ticket vending machine 108. Sensor measurement 604 may be a converted DC supply voltage collected after the AC supply voltage is passed through a DC power supply over a first time period. Sensor measurement 606 may be a converted DC supply voltage collected after the AC supply voltage is passed through the DC power supply over a second time period.

Predictive engine 502 may receive and analyze sensor measurements 602, 604, and 606 to determine whether a current or future defect exists within transit system 100. For example, the frequency and magnitude of sensor measurement 602 may be analyzed to determine whether each quantity is within a particular threshold (e.g., frequency between 55 Hz and 65 Hz). As another example, the voltage of sensor measurement 604 may be analyzed to determine whether it exceeds an upper threshold 608 or is less than a lower threshold 610. Because the voltage of sensor measurement 604 is within thresholds 608 and 610 over the measurement time period, it may be determined that no current or future defect exists. As another example, the voltage of sensor measurement 606 may be analyzed to determine whether it exceeds upper threshold 608 or is less than lower threshold 610. As shown, three irregularities 612 are detected where thresholds 608 and 610 are crossed over the measurement time period. In some embodiments, it may be determined that a current defect exists because the number of irregularities 612 exceeds an allowable amount. In some embodiments, it may be determined that a future defect exists because the number of irregularities 612 has increased by more than an allowable amount from a first measurement time period to a second measurement time period.

Figure 7:
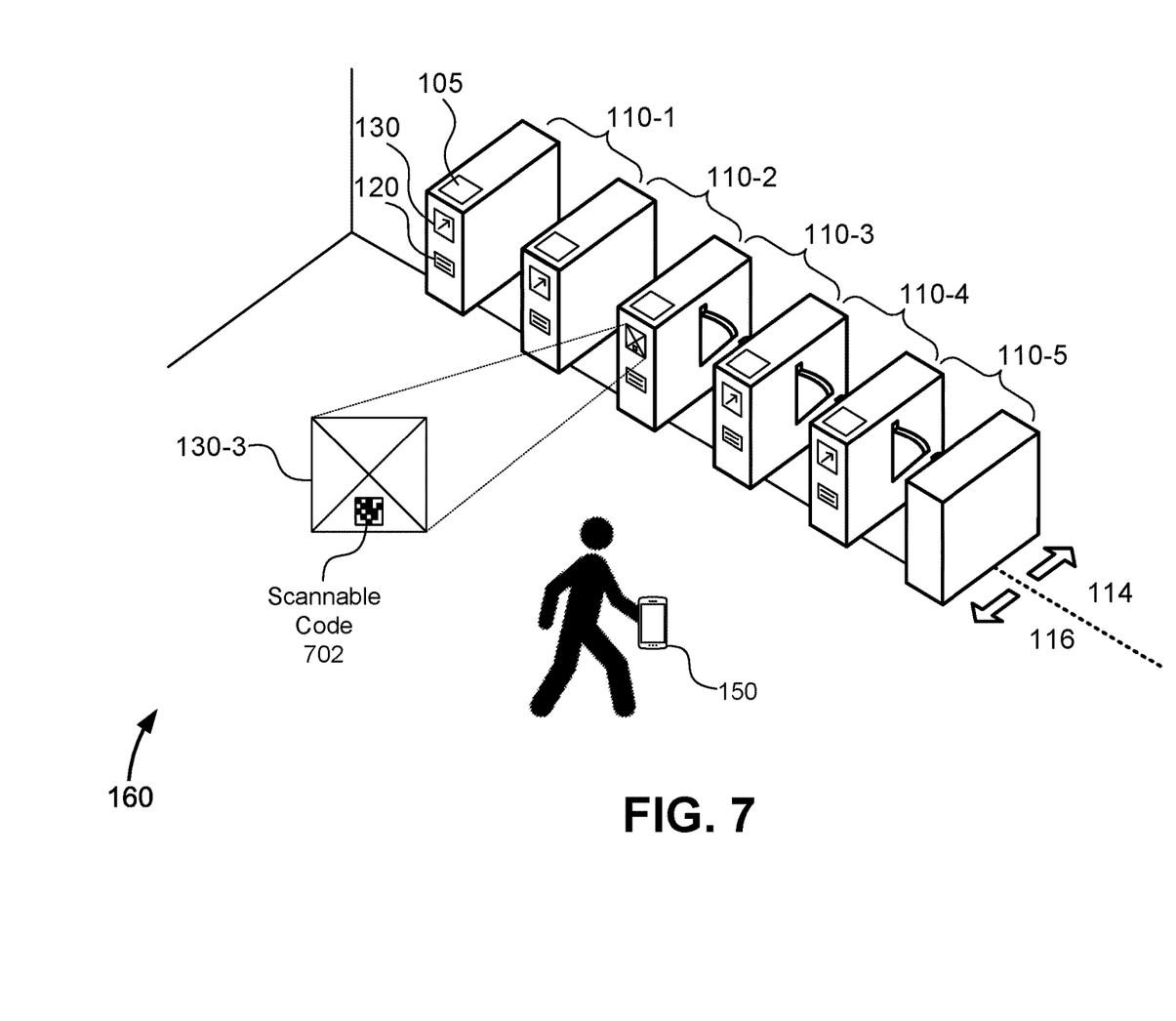
FIG. 7 illustrates an example of a transit location, according to some embodiments of the present invention.

FIG. 7 illustrates an example of transit location 160, according to some embodiments of the present invention. Transit location 160 as shown in FIG. 7 may correspond to a bus or train station, among other possibilities. Transit location 160 may include a plurality of gates 110 separating a restricted access area 114 from a non-restricted access area 116. One or more of gates 110 may be barrierless (i.e., "gateless") (e.g., gates 110-1 and 110-2) and one or more of gates 110 may include barriers (e.g., gates 110-3, 110-4, and 110-5). Each of gates 110 may include media reader 105 positioned along one or both sides of the passageways formed by each of gates 110. Each of gates 110 may also include audio system 120 and display system 130 positioned near media reader 105 for convenience to the transit customer.

Display system 130 may display information indicating which passageway corresponds to gate 110 so that transit customers can pass through the proper gate. Additionally or alternatively, display system 130 may display information indicating that gate 110 is out of service, such as that shown on display system 130-3. In some embodiments, display system 130-3 may display a scannable code 702 that may be read by portable electronic device 150 to allow the service technician to access maintenance instructions 508. According to one particular implementation, device router 506 may send maintenance instructions 508 to a display device associated with the particular transit location device 118 at which the defect exists. For example, if the particular transit location device 118 at which the defect exists is gate 110-3 or any component thereof, device router 506 may send maintenance instructions 508 to display system 130-3. In some instances, maintenance instructions 508 may be converted into scannable code 702 so that portable electronic device 150 can read scannable code 702 and automatically load maintenance instructions 508.

Figure 8:
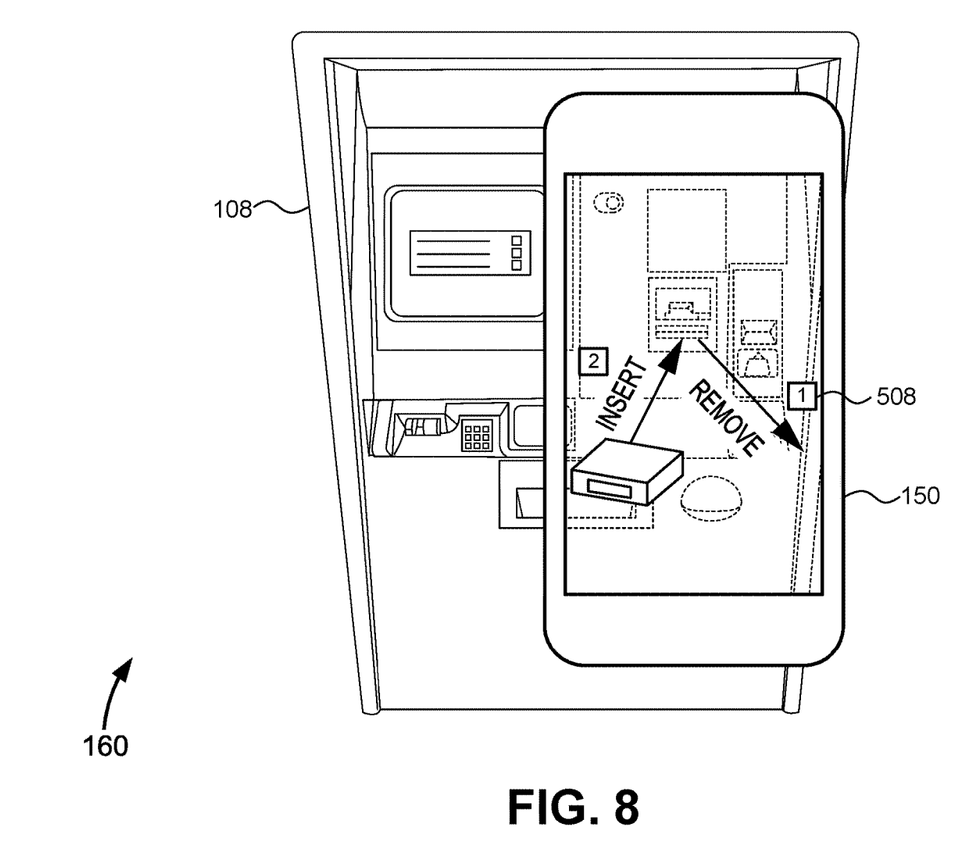
FIG. 8 illustrates an example of how a service technician can use maintenance instructions to address a defect, according to some embodiments of the present invention.

FIG. 8 illustrates an example of how a service technician can use maintenance instructions 508 to address a defect, according to some embodiments of the present invention. Maintenance instructions 508 may provide virtual instructions where the hardware itself is modeled and displayed in an AR visualization where virtual content is placed on top of real world objects. For example, a series of steps may be presented to the service technician showing how to remove a hardware component and replace it with a new hardware component. The virtual content may be displayed in a 2D or 3D manner and may be adjusted based on a camera angle or zoom setting of portable electronic device 150.

Figure 9:
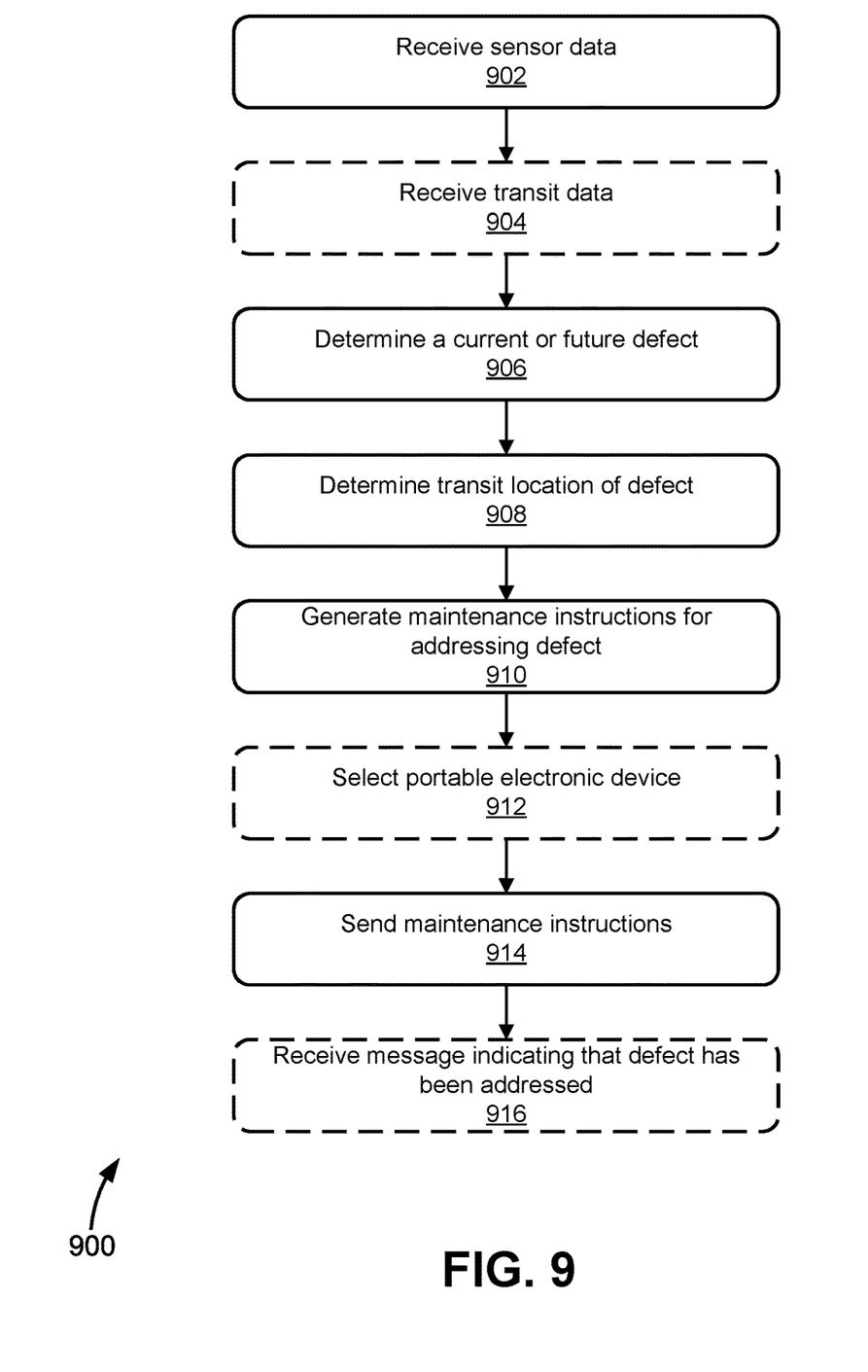
FIG. 9 illustrates a method for implementing a sensor-based automated transit maintenance system, according to some embodiments of the present invention.

FIG. 9 illustrates a method 900 for implementing a sensor-based automated transit maintenance system, according to some embodiments of the present invention. Method 900 may be performed in an order different than that shown, and not all steps of method 900 need be performed. In some embodiments, one or more steps of method 900 may be performed by one or more processors of transit server 142.

At step 902, sensor data 134 is received by transit server 142. In some embodiments, sensor data 134 may be collected by a plurality of sensors 104 located at a plurality of transit locations 160. Sensor data 134 may include sensor measurements of transit location devices 118 such as gate 110, ticket vending machine 108, or any devices or components included therein. Each of the sensor measurements may include a raw measurement corresponding to voltage, current, capacitance, inductance, temperature, frequency, or the like. In some embodiments, local data collector 102 receives the sensor measurements from sensors 104 and sends sensor data 134 to transit server 142.

At step 904, transit data 122 is received by transit server 142. In some embodiments, transit data 122 includes ridership information corresponding to at least one transit customer. The ridership information may include, e.g., a request from a transit customer to purchase a ticket, a request from a transit customer to create a transit customer account, an approved payment amount to be added to a transit customer account, an indication that a transit customer has entered transit system 100 through a gate, an indication that a transit customer has exited transit system 100 through a gate, and the like. The ridership information may also include data corresponding to a large group of transit customers, such as statistics regarding the number of transit customers using different gates or transit locations.

At step 906, it is determined that a current or future defect exists with transit system 100. The determination may be based on an analysis of sensor data 134 and/or transit data 122. In some embodiments, a current defect is determined to exist when an analysis of sensor data 134 and/or transit data 122 indicates that transit system 100 is currently not functioning properly. In contrast, a future defect is determined to exist when an analysis of sensor data 134 and/or transit data 122 indicates that transit system 100 will not function properly at a future time. In some embodiments, a future defect is determined to exist by generating a defect likelihood score based on sensor data 134 and/or transit data 122. The defect likelihood score may be compared to a threshold, and in response to determining that the defect likelihood score exceeds the threshold, it may be determined that a future defect exists.

At step 908, transit location 160 at which the defect is located is determined. In some embodiments, step 908 is performed concurrently and/or inherently with step 906 if sensor data 134 used to determine that a defect exists comes from a single transit location. In other embodiments, or in the same embodiments, sensor data 134 used to make the determination that a defect exists may be further analyzed to determine the origin of sensor data 134. For example, if it is determined that sensor data 134 used to make the determination that a defect exists was sent by local data collector 102, transit location 160 at which the defect is located is determined to be the same transit location as local data collector 102.

At step 910, maintenance instructions 508 for addressing the defect are generated. Maintenance instructions 508 may include textual, graphical, and/or audible instructions. In some embodiments, various sets of instructions for repairing transit location devices 118 may be stored in central data store 144 and may be retrieved by transit server 142. In some embodiments, maintenance instructions 508 are specifically tailored for the service technician using portable electronic device 150, taking into account factors such as level of expertise (which may affect the level of detail involved in maintenance instructions 508), language, tools available to the service technician, replacement parts available to the service technician, and the like.

At step 912, portable electronic device 150 is selected from a group of portable electronic devices. In some embodiments, the selection may be based on transit location 160, a current location of portable electronic device 150, a type of the defect, and/or maintenance instructions 508. For example, maintenance instructions 508 may be assigned to portable electronic device 150 based on the availability, the location, and the future location of the service technician using portable electronic device 150. In some embodiments, the skills of the service technician using portable electronic device 150 may be considered by matching the type of defect with the skills of the service technician (e.g., hardware defects may be matched with hardware service technicians, software defects may be matched with software service technicians, etc.).

At step 914, maintenance instructions 508 are sent from transit server 142 either to portable electronic device 150 or to one of transit location devices 118 at transit location 160. In some embodiments, if the particular transit location device 118 at which the defect exists is associated with a display device, device router 506 may send maintenance instructions 508 to the display device. In some embodiments, device router 506 may partition maintenance instructions 508 into virtual instructions and non-virtual instructions, and may send the virtual instructions to the display device and the non-virtual instructions to portable electronic device 150.

At step 916, a message indicating that the defect has been addressed is received by transit server 142. In some embodiments, the message may be generated by either portable electronic device 150 or by one of transit location devices 118 at transit location 160, depending on which received maintenance instructions 508 in step 914. The message may indicate whether the defect was completely repaired and whether additional repairs are needed.

Figure 10:
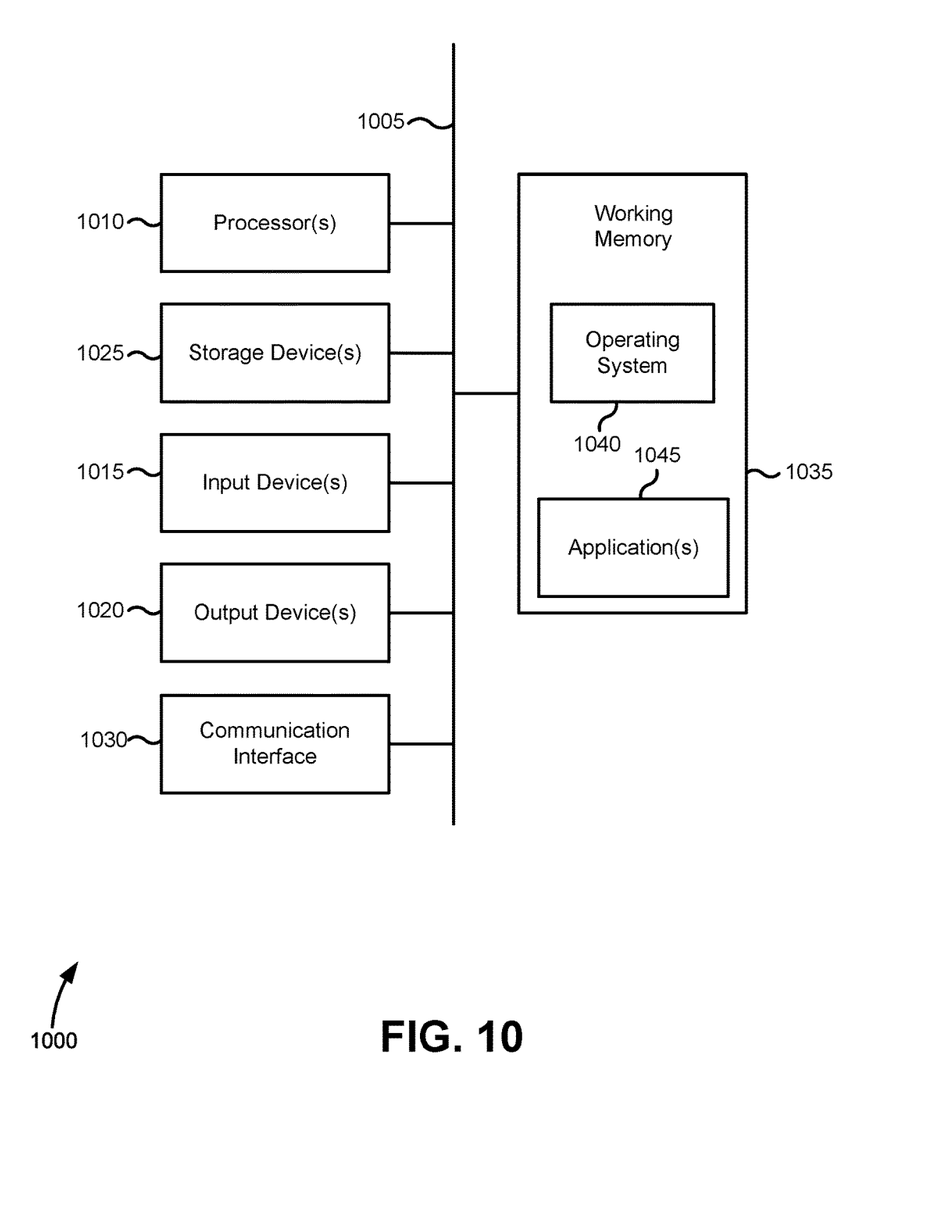
FIG. 10 illustrates a simplified computer system, according to some embodiments of the present invention.

FIG. 10 illustrates a simplified computer system 1000, according to some embodiments of the present invention. Computer system 1000 may be incorporated as part of the previously described computerized devices. For example, computer system 1000 can represent some of the components of transit server 142, portable electronic device 150, local data collector 102, gate 110, ticket vending machine 108, and the like. FIG. 10 provides a schematic illustration of one embodiment of a computer system 1000 that can perform the methods provided by various other embodiments, as described herein. FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include a processing unit 1010, including without limitation one or more general-purpose processors and/or one or more special-purpose processors (such as digital signal processing chips, graphics acceleration processors, and/or the like); one or more input devices 1015, which can include without limitation a keyboard, a touchscreen, receiver, a motion sensor, a camera, a smart-card reader, a contactless media reader, and/or the like; and one or more output devices 1020, which can include without limitation a display device, a speaker, a printer, a writing module, and/or the like.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1000 might also include a communication interface 1030, which can include without limitation a modem, a network card (wireless or wired), an infrared communication device, a wireless communication device and/or chipset (such as a Bluetooth™ device, an 802.11 device, a Wi-Fi device, a WiMax device, an NFC device, cellular communication facilities, etc.), and/or similar communication interfaces. The communication interface 1030 may permit data to be exchanged with a network (such as the network described below, to name one example), other computer systems, and/or any other devices described herein. In many embodiments, the computer system 1000 will further comprise a non-transitory working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a general purpose computer (or other device) to a special purpose computer that is configured to perform one or more operations in accordance with the described methods.

A set of these instructions and/or code might be stored on a computer-readable storage medium, such as the storage device(s) 1025 described above. In some cases, the storage medium might be incorporated within a computer system, such as computer system 1000. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 1010, applications 1045, etc.) Further, connection to other computing devices such as network input/output devices may be employed.

Some embodiments may employ a computer system (such as the computer system 1000) to perform methods in accordance with the disclosure. For example, some or all of the procedures of the described methods may be performed by the computer system 1000 in response to processing unit 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processing unit 1010 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1000, various computer-readable media might be involved in providing instructions/code to processing unit 1010 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1025. Volatile media include, without limitation, dynamic memory, such as the working memory 1035. Transmission media include, without limitation, coaxial cables, copper wire and fiber optics, including the wires that comprise the bus 1005, as well as the various components of the communication interface 1030 (and/or the media by which the communication interface 1030 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 1030 (and/or components thereof) generally will receive the signals, and the bus 1005 then might carry the signals (and/or the data, instructions, etc. carried by the signals) to the working memory 1035, from which the processor(s) 1005 retrieves and executes the instructions. The instructions received by the working memory 1035 may optionally be stored on a non-transitory storage device 1025 either before or after execution by the processing unit 1010.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

What is claimed is:

1. A transit maintenance system comprising:
   a plurality of sensors located at a plurality of transit locations within a transit system, wherein the plurality of sensors are configured to collect a plurality of sensor measurements of at least one transit location device;
   a transit server comprising one or more processors, wherein the one or more processors are configured to perform operations comprising:
     receiving sensor data comprising the plurality of sensor measurements;
     determining, based on the sensor data, that a current or future defect exists within the transit system;
     determining a transit location of the plurality of transit locations at which the defect is located;
     generating virtual and non-virtual maintenance instructions for addressing the defect; and
     sending the non-virtual maintenance instructions to a portable electronic device and the virtual maintenance instructions to one of the at least one transit location device at the transit location; and
   a display device located at the transit location, wherein the display device is configured to display a scannable code such that the portable electronic device is configured to access the virtual maintenance instructions upon reading the scannable code.

2. The transit maintenance system of claim 1, wherein the operations further comprise:
   receiving transit data from at least one of the plurality of transit locations, wherein the transit data includes ridership information, and wherein it is determined that the defect exists within the transit system further based on the transit data and the sensor data.

3. The transit maintenance system of claim 1, wherein each of the plurality of sensor measurements includes a raw measurement of a transit location device of the at least one transit location device, wherein the raw measurement corresponds to one or more of voltage, current, capacitance, inductance, temperature, and frequency.

4. The transit maintenance system of claim 1, further comprising:
   a plurality of local data collectors located at the plurality of transit locations, wherein each of the plurality of local data collectors is configured to:

receive at least one of the plurality of sensor measurements from at least one of the plurality of sensors; and send the at least one of the plurality of sensor measurements to the transit server.

5. The transit maintenance system of claim 1, wherein the operations further comprise:
generating, based on the sensor data, a defect likelihood score;
comparing the defect likelihood score to a threshold; and
in response to determining that the defect likelihood score exceeds the threshold, determining that a future defect exists within the transit system.

6. The transit maintenance system of claim 1, wherein the operations further comprise:
receiving, from the portable electronic device, a message indicating that the defect has been addressed.

7. A method comprising:
receiving sensor data comprising a plurality of sensor measurements of at least one transit location device, wherein the plurality of sensor measurements are collected by a plurality of sensors located at a plurality of transit locations within a transit system;
determining, based on the sensor data, that a current or future defect exists within the transit system;
determining a transit location of the plurality of transit locations at which the defect is located;
generating virtual and non-virtual maintenance instructions for addressing the defect;
sending the non-virtual maintenance instructions to a portable electronic device and the virtual maintenance instructions to one of the at least one transit location device at the transit location; and
displaying, by a display device located at the transit location, a scannable code such that a portable electronic device is configured to access the virtual maintenance instructions upon reading the scannable code.

8. The method of claim 7, further comprising:
receiving transit data from at least one of the plurality of transit locations, wherein the transit data includes ridership information, and wherein it is determined that the defect exists within the transit system further based on the transit data and the sensor data.

9. The method of claim 7, wherein each of the plurality of sensor measurements includes a raw measurement of a transit location device of the at least one transit location device, wherein the raw measurement corresponds to one or more of voltage, current, capacitance, inductance, temperature, and frequency.

10. The method of claim 7, wherein the sensor data is received from a plurality of local data collectors located at the plurality of transit locations, and wherein each of the plurality of local data collectors is configured to receive at least one of the plurality of sensor measurements from at least one of the plurality of sensors.

11. The method of claim 7, further comprising:
generating, based on the sensor data, a defect likelihood score;
comparing the defect likelihood score to a threshold; and
in response to determining that the defect likelihood score exceeds the threshold, determining that a future defect exists within the transit system.

12. The method of claim 7, further comprising:
receiving, from the portable electronic device, a message indicating that the defect has been addressed.

13. A non-transitory computer-readable medium comprising instructions that, when executed by one or more processors, cause the one or more processors to perform operations comprising:
receiving sensor data comprising a plurality of sensor measurements of at least one transit location device, wherein the plurality of sensor measurements are collected by a plurality of sensors located at a plurality of transit locations within a transit system;
determining, based on the sensor data, that a current or future defect exists within the transit system;
determining a transit location of the plurality of transit locations at which the defect is located;
generating virtual and non-virtual maintenance instructions for addressing the defect;
sending the non-virtual maintenance instructions to a portable electronic device and the virtual maintenance instructions to one of the at least one transit location device at the transit location; and
displaying, by a display device located at the transit location, a scannable code such that a portable electronic device is configured to access the virtual maintenance instructions upon reading the scannable code.

14. The non-transitory computer-readable medium of claim 13, wherein the operations further comprise:
receiving transit data from at least one of the plurality of transit locations, wherein the transit data includes ridership information, and wherein it is determined that the defect exists within the transit system further based on the transit data and the sensor data.

15. The non-transitory computer-readable medium of claim 13, wherein each of the plurality of sensor measurements includes a raw measurement of a transit location device of the at least one transit location device, wherein the raw measurement corresponds to one or more of voltage, current, capacitance, inductance, temperature, and frequency.

16. The non-transitory computer-readable medium of claim 13, wherein the sensor data is received from a plurality of local data collectors located at the plurality of transit locations, and wherein each of the plurality of local data collectors is configured to receive at least one of the plurality of sensor measurements from at least one of the plurality of sensors.

17. The non-transitory computer-readable medium of claim 13, wherein the operations further comprise:
generating, based on the sensor data, a defect likelihood score;
comparing the defect likelihood score to a threshold; and
in response to determining that the defect likelihood score exceeds the threshold, determining that a future defect exists within the transit system.

* * * * *